United States Patent [19]

Yoshimura et al.

[11] 4,022,742

[45] May 10, 1977

[54] COATING COMPOSITION

[75] Inventors: Tatsushiro Yoshimura, Takatsuki; Seisuke Suzue; Shigetake Tominaga, both of Ibaraki; Mutsusuke Namba; Toshio Mizuno, both of Setttsu, all of Japan

[73] Assignee: Daikin Kogyo Co., Ltd., Osaka, Japan

[22] Filed: May 27, 1975

[21] Appl. No.: 580,823

[30] Foreign Application Priority Data

May 27, 1974 Japan .............................. 49-59973

[52] U.S. Cl. ................. 260/29.6 F; 260/29.6 MM; 260/29.6 MQ
[51] Int. Cl.$^2$ ........................................ C08L 57/08
[58] Field of Search ............. 260/29.6 F, 29.6 MM, 260/29.6 MQ

[56] References Cited

UNITED STATES PATENTS

| | | | |
|---|---|---|---|
| 2,562,117 | 7/1951 | Osdal | 260/29.1 R |
| 3,486,911 | 12/1969 | Goldstein | 260/29.6 F |
| 3,554,955 | 1/1971 | Hartwimmer et al. | 260/29.6 F |
| 3,692,727 | 9/1972 | Peschko | 260/29.6 MM |
| 3,772,249 | 11/1973 | Morgans | 260/29.6 F |
| 3,838,082 | 9/1974 | Sauer | 260/29.6 MM |
| 3,850,867 | 11/1974 | Hartmann | 260/29.6 F |

Primary Examiner—M. J. Welsh
Attorney, Agent, or Firm—Birch, Stewart, Kolasch and Birch

[57] ABSTRACT

A coating composition comprising a fluororesin and a chelate compound of a transition element of Group IV in the periodic table in an aqueous medium, which can assure a firm adhesiveness to a substrate while maintaining advantageous properties inherent to the fluororesin.

8 Claims, No Drawings

COATING COMPOSITION

The present invention relates to a coating composition. More particularly, it relates to a fluororesin coating composition which is firmly bonded to a substrate and has a high resistance to hot water and oil which maintaining advantageous properties inherent to fluororesins.

Since fluororesins are excellent in resistance to heat and chemicals and possess advantageous characteristics such as low friction coefficient and no stickiness, they are widely used in various industrial fields including chemistry, electricity, mechanics and food. Due to their non-stickiness, however, they do not adhere firmly on a substrate, and somewhat special procedures are needed on preparation and application of their compositions in order to obtain a satisfactory adhesiveness. On the application, for instance, it is necessary to roughen the surface of a substrate physically or chemically so as to produce a so-called "anchor effect" which may be effective for assuring a firm adhesion and to apply an undercoating (primer coating) thereto for increasing the adhesiveness of a fluororesin.

Conventional compositions for the said undercoating comprise adhesive aids in dispersions of fluororesins. However, none of them is satisfactory to all of the various and different uses. Particularly widely used is an aqueous dispersion of a fluororesin incorporated with chromic acid (U.S, Pat. No. 2,562,117) or a mixture of chromic acid and phosphoric acid. The coating film obtained from such a composition is apt to be peeled off or swollen as small spots when contacted with hot water or oil having high temperatures over 200° C. In addition, the said composition includes a strongly acidic adhesive aid and, therefore, the problem of environmental pollution may arise from its use. Although a proposal to use a hydroxide of copper, zinc or cadmium as the adhesive aid has been made (Japanese Patent Publication No. 1394/1972), the problem of environment pollution can not be resolved thereby. There is also known another proposal by which various silicon compounds are incorporated into fluororesin dispersions (U.S. Pat. Nos. 3,694,392, 3,697,309, 3,655,604, and 3,644,260). However, the resulting coating film has only an insufficient resistance to boiling water and is restricted in thickness. There are also known some other proposals such as the use of metal salts of phosphoric acid as the adhesive aid (Japanese Patent Publication (Unexamined) No. 12331/1972, and U.S. Pat. No. 3,634,353), the use of thermoplastic resins having a good adhesive property to a substrate (Japanese Pat. Publication No. 27,131/1972) and the like. However, these proposals result in depression of the heat or corrosion resistance of the coating film and are thus not satisfactory solutions.

As the result of extensive studies overcoming the drawbacks as stated above, there has now been provided a fluororesin coating composition which comprises a fluororesin and a chelate compound of a transition element belonging to Group IV in the periodic table in an aqueous medium.

The coating film obtained from the coating composition of the present invention has a high hardness and a strong adhesiveness to a substrate and does not produce any swelling or peeling off even when contacted with boiling water or hot water for a long period of time. Since the coating composition of the invention does not contain chromic acid, phosphoric acid, heavy metal salts and so on, it can be handled with ease and does not produce any environmental pollution problem.

The coating composition of the invention is particularly useful for the formation of an undercoating. The coating film produced therefrom provides a good adhesion not only to the substrate but also to the coating film of any fluororesin coating composition formed thereon. Further, the coating composition of the invention may be used in a single application, i.e., without any finish coating (top coating).

The fluororesin to be employed in the coating composition of the invention may be a homopolymer of a fluoroolefin (e.g., tetrafluoroethylene, hexafluoropropene, fluoropropene, chlorotrifluoroethylene, vinyl fluoride, vinylidene fluoride) or a copolymer of a fluoroolefin with any other fluoroolefin or olefin (e.g., ethylene, propylene). In case of the copolymer of fluoroolefin with olefin, the content of fluorooelfin units may be at least 75% by weight. Particularly preferred fluororesins are polytetrafluoroethylene, tetrafluoroethylene/hexafluoropropene copolymer, tetrafluoroethylene/ethylene copolymer, etc. The particle size of the fluororesin may be usually not more than about $50\mu$, generally from about 0.1 to $50\mu$. The fluororesin prepared by a conventional emulsion polymerization procedure is normally from about 0.1 to $3.0\mu$ in particle size and may preferably be used in the coating composition of the invention.

The transition element belonging to Group IV in the periodic table may be titanium, zirconium, hafnium, thorium, etc. Among them, titanium and zirconium are particularly preferred from the practical viewpoint.

The chelate compound may be produced, for instance, according to the procedure as described in J.Am.Chem.Soc., 79, 4344 (1957); i.e., reacting one mole of a water-soluble salt or alkoxide of the transition element with at least one mole (usually two moles or more) of a chelating agent. Examples of the alkoxide are those represented by the formula: $Me(OR)_x$ wherein Me is a transition element belonging to Group IV of the periodic table, R is an alkyl group having 1 to 10 carbon atoms (preferably 3 to 7 carbon atoms), and $x$ is a number corresponding to the atomic valency of the transition element.

As the chelating agent, there may be used one having at least two functional groups, of which examples are as follows: polyvalent alcohols such as glycerol, ethylene glycol, octylene glycol, 1,3-butanediol, 2,3-butanediol and hexylene glycol, oxyaldehydes such as salicylaldehyde and glucose, oxyketones such as diacetone alcohol and fructose, oxycarboxylic acids such as glycolic acid, lactic acid, dioxymaleic acid and citric acid, diketones such as diacetylacetone, ketone acids such as acetoacetic acid, ketone acid esters such as ethyl acetoacetate, oxyamines such as triethanolamine and diethanolamine, oxyphenols such as catechol and pyrogallol, etc.

In the preparation of the chelating compound, particularly preferred is the elimination of from about 65 to 95% by weight (preferably not less than about 75% by weight) of the by-produced alcohol (ROH) from the reaction mixture by distillation under autogenic, atmospheric or reduced pressure, since the presence of the by-produced alcohol in the reaction mixture may deteriorate the stability of the coating composition on storage when it is incorporate therein as such.

The chelating compounds can be readily confirmed by IR absorption spectrum. Among the chelating compounds, some are water-soluble, and most are insoluble in water. Insoluble ones may be used in the form of a dispersion. In general, however, the use of any water-soluble one is favorable, because of the formation of a more uniform coating film.

The amount of $MeO_y$, as will be defined hereinbelow, in the chelating compound ranges from 10 to 80, preferably from 15 to 60, weight percent based on the combined amount of the flouroresin and the $MeO_y$ in th chelating compound. When the amount is out of the said range, the effect of this invention can not be achieved.

The coating composition of the invention may be prepared by admixing uniformly the fluororesin and the chelating compound in the said proportion in an aqueous medium. From the practical viewpoint, it is recommended to mix an aqueous dispersion or solution of the fluororesin with an aqueous dispersion or solution of the chelating compound. In the case of the fluororesin being powdery, it may be uniformly mixed into an aqueous dispersion or solution of the chelating compound. In order to mix said mixture uniformly, the use of a conventional mixer such as colloid mill or ball mill is desirable.

The incorporation of an inorganic, water-insoluble, fireproof material in a powdery form into the coating composition is favorable, since it can impart better various physical properties (e.g., heat resistance, corrosion resistance, hardness, adhesiveness, smoothness) to the resulting coating film. Examples of the said fireproof material are inorganic pigments (e.g., titanium oxide, iron oxide, carbon black), zinc powder, aluminum powder, zinc oxide, aluminum oxide, zirconium oxide, silica, ceramics, glass powder, powdered glass fibers, etc.

In the case of the fireproof material being used, a suitable proportion of the chelate compound, the fireproof material and the fluororesin may be as follows (the amount of the chelate compound being indicated in terms of the amount of the oxide of the transition element therein):

CHELATE COMPOUND $$\frac{MeO_y}{MeO_y + \text{Fireproof Material}} \times 100 = 10 \text{ to } 90 \% \text{ by weight (preferably 20 to 75 \% by weight)}$$

FLUORORESIN $$\frac{\text{Fluororesin}}{MeO_y + \text{Fireproof Material}} = 0.5 \text{ to } 5 \text{ by weight (preferably 1 to 3 by weight)}$$

wherein $MeO_y$ (y: the number corresponding to the atomic valency of the transition element Me/2) indicates the amount of the oxide of the transition element which is produced from the chelate compound on baking.

The incorporation of the fireproof material into the composition may be made in a conventional manner, and it is preferred to previously prepare an aqueous dispersion of the same and admix it uniformly. This aqueous dispersion with both the fluororesin and the chelate compound in the form of an aqueous dispersion or solution may preferably be mixed directly with each other.

When desired, any other additive such as a coloring agent (e.g., pigment), a dispersing agent (e.g., surfactant) or a viscosity regulator may also be incorporated therein.

Among various surfactants, particularly preferred are sulfonic acid derivatives and sulfuric ester derivatives, because they afford a favorable influence on various physical properties, particularly the adhesiveness of the coating film produced from the coating composition to a substrate. Examples of the sulfonic acid derivatives are alkylbenzenesulfonic acid and its salts (e.g., sodium, calcium, ammonium salts), naphthalenesulfonic acid and its salts (e.g., sodium, calcium, ammonium salts), dioctylsulfosuccinic acid and its salts (e.g., sodium, calcium, ammonium salts), etc. Examples of the sulfuric ester derivatives are sodium castor oil sulfate, ammonium castor oil sulfate, sodium lauryl sulfate, triethanolammonium lauryl sulfate, sodium polyoxyethylene alkyl sulfate, triethanolammonium polyoxyethylene alkyl sulfate, etc.

In case of the said surfactant, (i.e., sulfonic acid derivative or sulfuric ester derivative) being used, its suitable amount may be as follows:

SURFACTANT $$\frac{\text{Surfactant}}{MeO_y + \text{Fireproof Material}} \times 100 = 0.5 \text{ to } 30 \% \text{ by weight (preferably 3 to 15 \% by weight)}$$

wherein $MeO_y$ has the same meaning as explained above.

The thus prepared coating composition of the invention is a dispersion or solution comprising the fluororesin and the chelate compound with or without any other additive such as an inorganic, water-insoluble, fireproof material and a surfactant in an aqueous medium.

For application of the coating composition onto a substrate (e.g. metal, glass, ceramic), the surface of the substrate is preferably roughened previously by a conventional chemical or physical procedure and then cleaned. The application may be carried out by a conventional procedure such as brushing, spraying or immersing so as to make a film thickness of 5 to 30μ after baking. The applied coating composition is dried, for instance, in the atmosphere or by heating at around 100° C to remove water and any other volatile components therein. The coating film after drying is baked at a temperature higher than the melting point of the fluororesin, for instance, at about 327° to 400° C in case of the fluororesin being a tetrafluoroethylene resin. The baking is usually accomplished in a furnace for a period of several minutes to several hours. After baking, the coating film is cooled, for instance, by allowing it to stand or placing it in water.

As to the improvement of the characteristic properties of the coating film according to the present invention, it is presently assumed that, by baking at a high temperature as above, the organic portion of the chelate compound is decomposed to leave the metallic portion in the coating film as an oxide, which may contribute to the increase of the film characteristics. However, the exact mechanism is still uncertain.

When the coating composition is used for an undercoating, it is sufficient to apply the undercoating once. Where the coating composition is employed as both the undercoating and the finish coating, the application may be carried out repeatedly several times so as to make the coating film thick.

Alternatively, the finish coating may be formed by application of any other coating composition comprising a fluororesin of the same kind as or of the direction kind from a one used in the coating composition for undercoating according to a conventional procedure such as spray coating or powder coating. The surface coating may also be formed by heat pressing a film of a fluororesin on the undercoating.

Practical and presently preferred embodiments of the present invention are illustratively shown in the following Examples wherein parts and % are by weight unless otherwise indicated. The pencil hardness and the scratch test were determined according to the methods as described in JIS (Japan Industrial Standards) K6894; the resistance to hot water was determined by observation on the swelling and peeling off of the coating film formed on an aluminum plate after immersing in boiling water of above 95° C for 100 hours; and the resistance to hot oil was determined by observation on the swelling and peeling off of the coating film formed on an aluminum plate after immersing in hot plant oil of 200° C for 20 hours.

in particle size (prepared by emulsion polymerization) with a nin-ionic surfactant in a proportion as shown in Table 1 to give a coating composition.

An aluminum plate of 1.5 mm in thickness was sand-blasted, washed with trichloroethylene and the coating composition was applied thereto by spraying. After drying at a temperature around 100° C, the plate was baked in a furnace at 380° C for 15 minutes and then cooled to room temperature, whereby an undercoating film mainly consisting of PTFE and titanium and having a thickness of about $10\mu$ was formed.

A PTFE enamel "Polyflonenamel EK-4108 GY" manufactured by Daikin Kogyo Co., Ltd.) was applied on the undercoating film by spraying, dried, baked and cooled in the same manner as in the formation of the undercoating, whereby a finish coating film was formed.

The characteristic properties of the PTFE coating film thus formed were measured, and the results are shown in Table 1.

The Chelate $TiO_2 \times 100$/Chelate $TiO_2$ + PTFE in the second column in Tables 1, 2 and 3 is recited therein a %.

Table 1

| Run No. | Chelate $TiO_2 \times$ 100 Chelate $TiO_2$ + PTFE | Film properties | | | |
|---|---|---|---|---|---|
| | | Pencil hardness | Scratch test | Boiling water resistance | Hot oil resistance |
| 1 | 0 | <2B | 0 | Peeled | Swelling |
| 2 | 10 | HB | 3.5 | Little swelling | Little swelling |
| 3 | 16 | H | 5.0 | No swelling | No swelling |
| 4 | 23 | H | 5.0 | No swelling | No swelling |
| 5 | 42 | H | 5.0 | No swelling | No swelling |
| 6 | 63 | F | 5.0 | No swelling | No swelling |
| 7 | 80 | HB | 4.0 | Little swelling | No swelling |
| 8 | 94 | HB | 3.5 | Much swelling | Much swelling |
| 9 | 97 | 2B | 2.0 | Much swelling | Much swelling |

EXAMPLE 1

In a reactor, titanium tetra-n-butoxide (170 g; 0.5 mol) and triethanolamine (150 g; 1 mol) were charged at room temperature (about 25° C), and stirring was carried out for about 30 minutes while controlling the temperature below 50° C. Then, distillation was effected at 70° C under reduced pressure for about 1 hour so as to eliminate the produced butanol. The product (liquid) remaining in the reactor was confirmed to be a titanium chelate compound by IR absorption spectrum. The titanium content in the product was 11.8%.

The removed butanol amounted to about 80% of the alcohol corresponding to the whole amount of starting alkoxide.

The above prepared chelate compound was added to a 36.6% aqueous dispersion of polytetrafluoroethylene (hereinafter referred to as "PTFE" of about 0.1 ~0.3$\mu$

EXAMPLE 2

As in Example 1, except that ethyl acetoacetate (130 g; 1 mol) was used in place of triethanol-amine, the preparation of a chelate compound was effected, and a coating film of PTFE was formed. The characteristic properties of the PTFE coating film thus formed were measured, and the results are shown in Table 2.

Table 2

| Run No. | Chelate $TiO_2 \times$ 100 Chelate $TiO_2$ + PTFE | Film properties | | | |
|---|---|---|---|---|---|
| | | Pencil hardness | Scratch test | Boiling water resistance | Hot oil resistance |
| 1 | 16 | H | 4.5 | No swelling | No swelling |
| 2 | 42 | H | 5.0 | No swelling | No swelling |
| 3 | 80 | F | 4.0 | Little swelling | No swelling |
| 4 | 97 | B | 2.0 | Much swelling | Much swelling |

EXAMPLE 3

As in Example 1, titanium tetraisopropoxide (28 parts) and triethanolamine (30 parts) were reacted, and the reaction mixture was subjected to distillation under reduced pressure for removal of isopropanol to give a chelate compound, which was admixed with an aqueous dispersion of PTFE to give a coating composition for undercoating. In the same manner as in Example 1, a coating film of PTFE was formed, and its characteristic properties were measured.

The removed isopropanol amounted to about 80% of the isopropanol corresponding to the whole amount of starting propoxide.

The results are shown in Table 3.

Table 3

| Run No. | $\frac{\text{Chelate TiO}_2}{\text{Chelate TiO}_2 + \text{PTFE}} \times 100$ | Film properties | | | |
|---|---|---|---|---|---|
| | | Pencil hardness | Scratch test | Boiling water resistance | Hot oil resistance |
| 1 | 0 | < 2B | Peeled | Peeled | Swelling |
| 2 | 10 | F | 3.5 | Little swelling | Little swelling |
| 3 | 16 | 2H | 5.0 | No swelling | No swelling |
| 4 | 23 | H | 5.0 | No swelling | No swelling |
| 5 | 42 | H | 5.0 | No swelling | No swelling |
| 6 | 63 | F | 5.0 | No swelling | No swelling |
| 7 | 80 | HB | 3.0 | Little swelling | Little swelling |
| 8 | 94 | B | 3.0 | Much swelling | Much swelling |
| 9 | 97 | 2B | 2.0 | Much swelling | Swelling |

EXAMPLE 4

As in Example 1, titanium tetra-n-butoxide and triethanolamine were reacted to give a chelate compound. Separately, titanium oxide (50 parts), water (50 parts) and a non-ionic surfactant (2.5 parts) were mixed together in a ball mill for 48 hours to make a dispersion of titanium oxide. The dispersion was admixed with the chelate compound and a 36.6% aqueous dispersion of PTFE to make an undercoating composition having a TiO₂ (in the chelate compound)/TiO₂ (in the chelate compound) + PTFE ratio (by weight) of 23/100 and a TiO₂/TiO₂ + TiO₂ (in the chelate compound) ratio (by weight) a shown in Table 4.

As in Example 1, the undercoating composition was applied on an aluminum plate and a surface coating composition of PTFE was applied thereto.

The characteristic properties of the coating film thus formed were measured, and the results are shown in Table 4.

Table 4

| Run No. | $\frac{\text{TiO}_2}{\text{Chelate TiO}_2 + \text{TiO}_3} \times 100$ (%) | Film properties | | | |
|---|---|---|---|---|---|
| | | Pencil hardness | Scratch test | Boiling water resistance | Hot oil resistance |
| 1 | 10 | H | 5.0 | No swelling | No swelling |
| 2 | 15 | 2H | 5.0 | No swelling | No swelling |
| 3 | 21 | 2H | 5.0 | No swelling | No swelling |
| 4 | 38 | 2H | 5.0 | No swelling | No swelling |
| 5 | 71 | HB | 3.0 | Little swelling | Little swelling |
| 6 | 84 | B | 3.0 | Much swelling | Much swelling |

EXAMPLE 5

As in Example 1, titanium tetra-n-butoxide (340 parts) and lactic acid (180 parts) were reacted at 25° to 50° C to give a chelate compound. Separately, powdery titanium oxide (50 parts), water (100 parts), and a non-ionic surfactant (5 parts) were mixed together in a ball mill for 48 hours to make a titanium oxide paste. The chelate compound and the titanium oxide paste were mixed with powdery tetrafluoroethylene/hexafluoropropene copolymer (hereinafter referred to as "TFE/HFP copolymer" of 20μ in average particle size (HFP content, 16 mol %), water was added thereto to make a solids content of 30% and then the resultant mixture was kneaded well in a ball mill to make a coating composition (B). Similarly, the titanium oxide paste was mixed with powdery TFE/HFP copolymer and then with water to make a coating composition (A).

The removed butanol amounted to about 70% of the butanol corresponding to the whole amount of starting butoxide.

As in Example 1, each of the coating compositions (A) and (B) was applied on an aluminum plate, and a 39% aqueous dispersion of TFE/HFP copolymer with a non-ionic surfactant was sprayed thereon. After drying by the use of an IR lamp, the plate was baked in a furnace of 380° C for 15 minutes and then cooled to room temperature.

The characteristic properties of the coating film were measured, and the results are shown in Table 5. The Chelate TiO₂ × 100/Chelate TiO₂ + TFE/HFP copolymer in the second column thereof is recited in %.

Table 5

| Run No. | $\frac{\text{Chelate} \times 100}{\text{Chelate} + \text{TFE/HFP}}$ TiO₂ copolymer | Film properties | | | |
|---|---|---|---|---|---|
| | | Pencil hardness | Scratch test | Boiling water resistance | Hot oil resistance |
| 1 | 10 | H | 4.5 | Little swelling | Little swelling |
| 2 | 23 | 3H | 5.0 | No swelling | No swelling |

EXAMPLE 6

On an aluminum plate undercoated as in Example 1, a film of TFE/HFP copolymer (HFP content 16 mol %) of 25μ in thickness was heat-pressed at 320° C under 7 kg/cm² for 5 minutes.

The film of the thus obtained laminated plate was cut in a rectangular form of 1 cm wide and peeled off at a rate of 50 mm/minute by the use of an autographic tension recording machine to show a peeling off strength of 3.5 kg/cm.

The pencil hardness and the scratch test of the film were carried out before and after the test for resistance to hot water or resistance to hot oil. The results are shown in Table 6.

Table 6

|  | Before testing | After testing for boiling water resistance | After testing for hot oil resistance |
|---|---|---|---|
| Pencil hardness | H | H | F |
| Scratch test | 4.5 | 4.5 | 4.5 |

EXAMPLE 7

Zirconium tetraisopropoxide (327 parts) and lactic acid (180 parts) were reacted at 25° to 50° C and subjected to distillation under reduced pressure for elimination of isopropanol, whereby a chelate compound was obtained. As in Example 1, the chelate compound was added to a PTFE dispersion to give a coating composition, which was then applied on an aluminum plate.

The characteristic properties of the thus formed film were measured, and the results are shown in Table 7. The Chelate $ZrO_2 \times 100$/Chelate $ZrO_2$ + PTFE in the second column thereof is recited in %.

Table 7

| Run No. | Chelate × 100 / Chelate + PTFE $ZrO_2$ | Film properties | | | |
|---|---|---|---|---|---|
|  |  | Pencil hardness | Scratch test | Boiling water resistance | Hot oil resistance |
| Swelling | 0 | < 2B | — | | Swelling |
| No swelling | 16 | H | 5.0 | | No swelling |
| No swelling | 63 | F | 5.0 | | No swelling |
| Little swelling | 87 | HB | 2.0 | | Little swelling |

EXAMPLE 8

Tetra-n-butyl titanate and octylene glycol were mixed together in a proportion of 1:2 by mol at room temperature, and the mixture was subjected to reaction at a temperature below 50° C for 30 minutes. After the pressure was reduced to 10 mm Hg in a nitrogen stream, the temperature was elevated to 100° C and the removal of butanol was continued for 30 minutes, whereby a chelate compound was obtained as a white solid. The white solid was pulverized and passed through a 100-mesh sieve. The resulting powder was admixed with powdery TFE/HFP copolymer (HFP content, 20 mol %) of 150μ in average particle size in a proportion as shown in Table 8. The resultant mixture was applied by spraying to the roughened surface of an aluminum plate of 1.5 mm in thickness and baked in a furnace of 380° C for 30 minutes. On the undercoating film as above formed, the said TFE/HFP copolymer powder was powder coated, followed by baking.

The characteristic properties of the coating film were measured, and the results are shown in Table 8.

Table 8

|  | Undercoating composition | | Film thickness ($\mu$) | Pencil hardness | Scratch test | After testing for boiling water resistance | |
|---|---|---|---|---|---|---|---|
| Run No. | Chelate compound (parts) | TFE/HFP copolymer (parts) |  |  |  | Pencil hardness | Scratch test |
| 1 | 100 | 100 | 65 | 3H | 5.0 | 2H | 4.0 |
| 2 | 50 | 100 | 60 | 2H | 5.0 | H | 4.0 |
| 3 | 0 | 100 | 60 | H | 5.0 | B | 3.5 |

EXAMPLE 9

Titanium tetra-n-butoxide (340 g; 1 mol) and triethanolamine (300 g; 2 mol) were reacted with stirring, and about 80% by weight of the by-produced n-butanol was eliminated by distillation at 150° C under atmospheric pressure. The titanium content (in terms of titanium oxide) in the product was 20%.

The thus produced chelate compound was added to a 60% aqueous dispersion of PTFE (particle size: about 0.1 to 0.3μ) with a non-ionic surfactant, and sodium lauryl sulfonate and a 30% aqueous dispersion of titanium oxide were added thereto as shown in Table 9 to make a coating composition.

An aluminum plate of 1.5 mm in thickness was sandblasted, washed with trichloroethylene and applied to the coating composition by spraying. After drying at a temperature around 100° C, the plate was baked in a furnace at 380° C for 15 minutes and then cooled to room temperature, whereby an undercoating film mainly consisting of PTFE and titanium and having a thickness of about 10μ was formed.

A PTFE enamel was applied on the undercoating film by spraying, dried, baked and cooled in the same manner as in the formation of the undercoating, whereby a surface coating film was formed.

The characteristic properties of the PTFE coating film thus formed were measured, and the results are shown in Table 9.

Table 9

| Run No. | PTFE Chelate TiO₂ + TiO₂ | TiO₂ × 100 Chelate TiO₂ + TiO₂ (%) | Sodium lauryl-sulfate × 100 Chelate TiO₂ + TiO₂ (%) | Pencil hardness | Scratch test | Peeling strength | Boiling water resistance | Hot oil resistance |
|---|---|---|---|---|---|---|---|---|
| 1 | 2.0 | 65 | 5 | 2H | 5 | 1.8 | No swelling | No swelling |
| 2 | 2.0 | 65 | 10 | 2H | 5 | 2.0 | No swelling | No swelling |
| 3 | 2.0 | 65 | 20 | 2H | 5 | 2.5 | Little swelling | No swelling |
| 4 | 2.0 | 65 | 30 | H | 5 | 2.5 | Much swelling | No swelling |
| 5 | 2.0 | 22 | 15 | 2H | 5 | 1.8 | No swelling | No swelling |
| 6 | 2.0 | 43 | 15 | 2H | 5 | 2.3 | No swelling | No swelling |
| 7 | 2.0 | 75 | 15 | H | 5 | 2.0 | No swelling | No swelling |
| 8 | 2.0 | 86 | 15 | H | 4.5 | 1.7 | No swelling | No swelling |
| 9 | 1.7 | 65 | 10 | 2H | 5 | 2.5 | No swelling | No swelling |
| 10 | 1.5 | 65 | 10 | 2H | 5 | 2.5 | No swelling | No swelling |
| 11 | 1.0 | 65 | 10 | F | 4.5 | 1.5 | No swelling | Swelling |
| 12 | 3.0 | 65 | 15 | H | 4 | 1.3 | Swelling | Swelling |

EXAMPLE 10

As in Example 9, but a certain proportion of the byproduced n-butanol was eliminated by distillation from the reaction mixture, there was prepared a coating composition for undercoating, by which a coating film was formed.

The characteristic properties of the coating film were measured, and the results are shown in Table 10.

Table 10

| Run No. | Elimination percentage of butanol (%) | PTFE Chelate TiO₂ + TiO₂ | TiO₂ × 100 Chelate TiO₂ + TiO₂ (%) | Sodium lauryl-sulfate × 100 Chelate TiO₂ + TiO₂ (%) | Stability of undercoating composition | Pencil hardness | Scratch test | Boiling water resistance | Hot oil resistance |
|---|---|---|---|---|---|---|---|---|---|
| 1 | 50 | 2.0 | 65 | 10 | Not well | 2H | 5 | No swelling | No swelling |
| 2 | 0 | 2.0 | 22 | 0 | Coagulated | — | — | — | — |
| 3 | 60 | 1.5 | 65 | 10 | Not well | 2H | 5 | No swelling | No swelling |
| 4 | 0 | 1.0 | 65 | 10 | Coagulated | — | — | — | — |

EXAMPLE 11

As in Example 9, but sodium lauryl sulfonate was not used, a coating composition for undercoating was produced and a coating film was formed thereby.

The characteristic properties of the coating film were measured, and the results are shown in Table 11.

Table 11

| Run No. | PTFE Chelate TiO₂ + TiO₂ | TiO₂ × 100 Chelate TiO₂ + TiO₂ (%) | Sulfuric ester or Sulfonic ester | Pencil hardness | Scratch test | Peeling strength | Boiling water resistance | Hot oil resistance |
|---|---|---|---|---|---|---|---|---|
| 1 | 2 | 22 | 0 | H | 4.5 | 1.2 | No swelling | No swelling |
| 2 | 2 | 65 | 0 | H | 5 | 1.5 | No swelling | No swelling |
| 3 | 2 | 75 | 0 | H | 5 | 1.5 | No swelling | No swelling |
| 4 | 1 | 65 | 0 | F | 4 | 1.0 | No swelling | Swelling |

EXAMPLE 12

As in Example 9 but any fireproof material was not incorporated, there was prepared a coating composition, and a coating film was formed thereby.

The characteristic properties of the coating film were measured, and the results are shown in Table 12.

Table 12

| Run No. | PTFE Chelate TiO₂ + TiO₂ | TiO₂ × 100 Chelate TiO₂ + TiO₂ (%) | Sodium lauryl sulfate × 100 Chelate TiO₂ + TiO₂ (%) | Pencil hardness | Scratch test | Peeling strength | Boiling water resistance | Hot oil resistance |
|---|---|---|---|---|---|---|---|---|
| 1 | 2 | 0 | 0 | H | 4.5 | 0.9 | No swelling | No swelling |
| 2 | 2 | 0 | 5 | H | 5 | 1.3 | No swelling | No swelling |

Table 12-continued

| | Proportion in undercoating composition (by weight) | | | Film properties | | | | |
|---|---|---|---|---|---|---|---|---|
| Run No. | PTFE / Chelate TiO$_2$ + TiO$_2$ | TiO$_2$ × 100 / Chelate TiO$_2$ + TiO$_2$ (%) | Sodium lauryl sulfate × 100 / Chelate TiO$_2$ + TiO$_2$ (%) | Pencil hardness | Scratch test | Peeling strength | Boiling water resistance | Hot oil resistance |
| 3 | 2 | 0 | 15 | H | 5 | 1.5 | No swelling | No swelling |
| 4 | 1 | 0 | 10 | F | 4 | 1.0 | No swelling | Swelling |

EXAMPLE 13

Titanium tetraisopropoxide (142 g; 0.5 mol), lactic acid (22 g; 0.25 mol) and triethanolamine (75 g; 0.5 mol) were reacted while stirring, and about 70% of the by-produced isopropanol was eliminated by distillation at 142° C under atmospheric pressure. The titanium content (in terms of titanium oxide) in the product was 25%.

The thus obtained chelate compound was added to a 60% aqueous dispersion of PTFE of about 0.1 to 0.3μ in particle size prepared by emulsion polymerization and dispersed by the aid of a non-ionic surfactant. The resulting mixture was incorporated with an aqueous solution of sodium alkylbenzenesulfonate and a 30% aqueous dispersion of zinc powder as shown in Table 13 to make a coating composition.

The coating composition was applied on an iron plate to form a coating film, of which the characteristic properties were measured. The results are shown in Table 13.

Table 13

| | Proportion in undercoating composition (by weight) | | | Film Properties | | | | |
|---|---|---|---|---|---|---|---|---|
| Run No. | PTFE / Chelate TiO$_2$ + Zn | Zn × 100 / Chelate TiO$_2$ + Zn (%) | Sodium alkyl- benzenesulfo- nate × 100 / Chelate TiO$_2$ + Zn (%) | Pencil hardness | Scratch test | Peeling strength | Boiling water resistance | Hot oil resistance |
| 1 | 2 | 65 | 5 | 2H | 5 | 1.8 | No swelling | No swelling |
| 2 | 2 | 65 | 10 | 2H | 5 | 2.3 | No swelling | No swelling |
| 3 | 2 | 65 | 15 | 2H | 5 | 2.5 | No swelling | No swelling |
| 4 | 2 | 65 | 30 | 2H | 5 | 2.6 | Little swelling | No swelling |
| 5 | 1.5 | 65 | 10 | H | 5 | 2.1 | No swelling | No swelling |
| 6 | 1.0 | 65 | 10 | F | 4.5 | 1.5 | No swelling | No swelling |

EXAMPLE 14

Zirconium tetra-n-butoxide (190 g; 0.5 mol), acetylacetone (25 g; 0.25 mol) and triethanolamine (113 g; 0.75 mol) were reacted while stirring, and about 80% of the by-produced butanol was eliminated by distillation at 155° C. The zirconium content (in terms of zirconium oxide) in the product was 29%.

The thus obtained chelate compound was added to a 40% aqueous dispersion of TFE/HFP copolymer with a non-ionic surfactant, and a 30% aqueous dispersion of carbon black powder and triethanolammonium lauryl sulfonate were added thereto as shown in Table 14 to make a coating composition.

The characteristic properties of the coating film made by the use of the coating composition were measured, and the results are shown in Table 14.

Table 14

| | Proportion in undercoating composition (by weight) | | | Film properties | | | | |
|---|---|---|---|---|---|---|---|---|
| Run No. | TFE/HFP / Chelate ZrO$_2$ + C | C × 100 / Chelate ZrO$_2$ + C (%) | Triethanol- amine lauryl- sulfate × 100 / Chelate ZrO$_2$ + C (%) | Pencil hardness | Scratch test | Peeling strength | Boiling water resistance | Heat oil resistance |
| 1 | 4 | 43 | 10 | H | 4.5 | 1.8 | No swelling | No swelling |
| 2 | 3 | 65 | 10 | 2H | 5 | 1.5 | No swelling | No swelling |
| 3 | 3 | 43 | 10 | 2H | 5 | 2.5 | No swelling | No swelling |
| 4 | 3 | 22 | 15 | H | 5 | 2.0 | No swelling | No swelling |
| 5 | 2 | 65 | 5 | H | 4.5 | 1.5 | No swelling | No swelling |
| 6 | 2 | 43 | 10 | H | 4.5 | 2.0 | No swelling | No swelling |
| 7 | 1 | 65 | 15 | F | 4 | 1.3 | No swelling | No swelling |
| 8 | 1 | 43 | 30 | F | 4 | 1.5 | Little swelling | No swelling |

EXAMPLE 15

Titanium tetra-n-butoxide (170 g; 0.5 mol) and triethanolamine (120 g; 0.8 mol) were reacted while stirring, and the by-produced butanol was eliminated by distillation under atmospheric pressure. The titanium content (in terms of titanium oxide) in the product was 20%.

The thus obtained chelate compound was added to a 60% aqueous dispersion of PTFE prepared by emulsion polymerization and dispersed by the aid of a surfactant, and a 30% aqueous dispersion of finely pulverized titanium oxide was added thereto to make a coating composition.

An aluminum plate of 1.5 mm in thickness was sand-blasted, washed with trichloroethylene and the coating composition was applied thereto by spraying. After drying at a temperature around 100° C, the plate was baked in a furnace at 380° C for 15 minutes and then cooled to room temperature, whereby an undercoating film having a thickness of about 10μ was formed.

A PTFE enamel (Polyflonenamel EK-4108 GY", manufactured by Daikin Kogyo Co., Ltd.) was applied on the undercoating film by spraying, dried, baked and cooled in the same manner as in the formation of the undercoating, whereby a surface coating film was formed.

The characteristic properties of the PTFE coating film thus formed were measured, and the results are shown in Table 15.

stirred, to eliminate the by-product butanol, thereby producing a titanium chelate compound. The amount of titanium in the chelate compound was found to be 13.2 weight percent as calculated as $TiO_2$.

To the resulting chelate compound was added as in Example 1 a 60 weight percent aqueous dispersion of finely divided iron oxide so as to make the iron oxide content in the proportions as shown in Table 16.

The resulting undercoating composition was applied to a blasted aluminum plate and baked in the same manner as in Example 1. To this plate was applied enamel as a top coat and the product was then baked. The resulting product was determined to have the properties as shown in Table 16.

Table 16

| | Proportion in undercoating composition (by weight) | | Iron × 100 oxide | Film properties | | | | |
|---|---|---|---|---|---|---|---|---|
| | PTFE | | Chelate Iron | | | Peeling off | Boiling | |
| Run No. | Chelate $TiO_2$ + | Iron oxide | $TiO_2$ + oxide (%) | Pencil hardness | Scratch test | strength (kg/cm) | water resistance | Hot oil resistance |
| 1 | 2 | | 0 | H | 4.5 | 0.9 | No swelling | No swelling |
| 2 | 2 | | 22 | H | 4.5 | 1.5 | No swelling | No swelling |
| 3 | 2 | | 43 | 2H | 5 | 1.8 | No swelling | No swelling |
| 4 | 2 | | 65 | 2H | 5 | 1.6 | No swelling | No swelling |
| 5 | 2 | | 75 | H | 5 | 1.3 | No swelling | No swelling |
| 6 | 2 | | 86 | H | 4.5 | 1.0 | No swelling | No swelling |

EXAMPLE 17

A mixture of titanium tetraisopropoxide (123 g; 0.5 mol), lactic acid (45 g; 0.5 mol) and triethanol amine (75 g; 0.5 mol) was reacted with each other while being stirred. The resulting mixture was heated while being stirred to remove the resulting isopropanol. The amount of titanium in the resulting chelate compound was found to be 11.3 weight percent as determined as titanium oxide.

To the resulting chelate compound were added a 39 weight percent aqueous dispersion of finely divided TFE/HFP copolymer with a non-ionic surfactant and a 20 weight % aqueous dispersion of carbon black with the non-ionic susrfactant so that the carbon black had the proportions as shown in Table 17.

Table 15

| | Proportion in undercoating composition (by weight) | $TiO_2$ × 100 | Film properties | | | | |
|---|---|---|---|---|---|---|---|
| Run No. | PTFE Chelate $TiO_2$ + $TiO_2$ | Chelate $TiO_2$ + $TiO_2$ (%) | Pencil hardness | Scratch test | Peeling off strength (kg/cm) | Boiling water resistance | Hot oil resistance |
| 1 | 3 | 0 | HB | 4 | 0.6 | No swelling | Swelling |
| 2 | 3 | 65 | H | 4.5 | 1.2 | No swelling | No swelling |
| 3 | 2 | 0 | H | 4.5 | 0.9 | No swelling | No swelling |
| 4 | 2 | 22 | H | 4.5 | 1.3 | No swelling | No swelling |
| 5 | 2 | 43 | 2H | 5 | 1.6 | No swelling | No swelling |
| 6 | 2 | 65 | 2H | 5 | 1.9 | No swelling | No swelling |
| 7 | 2 | 75 | 2H | 5 | 1.7 | No swelling | No swelling |
| 8 | 2 | 86 | H | 4.5 | 1.4 | No swelling | No swelling |
| 9 | 1.7 | 65 | 2H | 5 | 2.0 | No swelling | No swelling |
| 10 | 1.3 | 43 | H | 5 | 2.1 | No swelling | No swelling |
| 11 | 1.3 | 65 | H | 5 | 2.0 | No swelling | No swelling |
| 12 | 1.3 | 75 | H | 5 | 2.0 | No swelling | No swelling |
| 13 | 1.3 | 86 | H | 5 | 1.8 | No swelling | No swelling |
| 14 | 1.0 | 0 | HB | 4 | 1.0 | No swelling | Swelling |
| 15 | 1.0 | 65 | H | 4.5 | 1.4 | No swelling | No swelling |

EXAMPLE 16

Titanium tetrabutoxide (170 g; 0.5 mol) was reacted with triethanol amine (88 g; 1.25 moles) while being stirred. The resulting product was heated, while being The resulting undercoating composition was applied to a sand-blasted aluminum plate followed by coating with a topcoat enamel as in Example 1. The resulting product was then subjected to tests with the results as shown in Table 17.

Table 17

| Run No. | Proportion in undercoating composition (by weight) | | Film properties | | | | |
|---|---|---|---|---|---|---|---|
| | FEP / (Chelate TiO₂ + C) | C × 100 / (Chelate TiO₂ + C) (%) | Pencil hardness | Scratch test | Peeling off strength (kg/cm) | Boiling water resistance | Hot oil resistance |
| 1 | 2 | 0 | H | 4 | 0.6 | No swelling | No swelling |
| 2 | 2 | 22 | 2H | 5 | 1.8 | No swelling | No swelling |
| 3 | 2 | 43 | 2H | 5 | 2.0 | No swelling | No swelling |
| 4 | 2 | 65 | H | 5 | 1.2 | No swelling | No swelling |
| 5 | 2 | 75 | HB | 3.5 | 0.6 | No swelling | No swelling |
| 6 | 2 | 86 | HB | 3 | 0.5 | No swelling | No swelling |

EXAMPLE 18

A mixture of zirconium tetrabutoxide (192 g; 0.5 mol), acetylacetone (3 g; 0.3 mol) and triethanol amine (105 g; 0.7 mol) was reacted with each other while being stirred. The resulting mixture was heated while being stirred to remove the butanol produced to give a zirconium chelate compound. The amount of zirconium in the chelate compound was determined to be 25 weight percent as calculated as $ZrO_2$.

To the resulting chelate compound were added a 60 weight % aqueous solution of PTFE and a 30 weight % aqueous dispersion of finely divided zinc powders suspended in a non-ionic dispersion so that the zinc had the proportions as shown in Table 18.

The resulting coating composition was applied to a blasted aluminum plate and backed as in Example 1. A topcoat enamel was applied to the surface thereof and the resulting product was baked.

The test results are shown in Table 18.

Table 18

| Run No. | Proportion in undercoating composition (by weight) | | Film properties | | | | |
|---|---|---|---|---|---|---|---|
| | PTFE / (Chelate ZrO₂ + Zn) | Zn × 100 / (Chelate ZrO₂ + Zn) (%) | Pencil hardness | Scratch test | Peeling off strength (kg/cm) | Boiling water resistance | Hot oil resistance |
| 1 | 2 | 0 | H | 4.5 | 0.9 | No swelling | No swelling |
| 2 | 2 | 22 | H | 5 | 1.3 | No swelling | No swelling |
| 3 | 2 | 43 | 2H | 5 | 1.5 | No swelling | No swelling |
| 4 | 2 | 65 | 2H | 5 | 1.8 | No swelling | No swelling |
| 5 | 2 | 75 | H | 5 | 1.5 | No swelling | No swelling |
| 6 | 2 | 86 | H | 4.5 | 1.4 | No swelling | No swelling |

What is claimed is:

1. A coating composition for formation of an undercoating film upon baking, which comprises a fluororesin having a particle size of 0.1 to 50 μ, a chelate compound prepared by reacting a water-soluble salt or alkoxide of a transition element of Group IV in the Periodic Table with a chelating agent and an inorganic, water-insoluble, fireproof material durable under the sintering temperature of the fluororesin in an aqueous medium containing a surfactant, said chelate compound forming an oxide of the transition element upon baking, the amount of the oxide of the transition element so formed being from 10 to 80% by weight based on the combined amount of said fluororesin and said transition element oxide.

2. The coating composition according to claim 1, wherein the chelate compound is prepared by reacting an alkoxide of the formula $Me(OR)_x$, wherein Me is a transition element of Group IV in the Periodic Table, R is an alkyl group having 1 to 10 carbon atoms, and x is a number corresponding to the atomic valency of the transition element, with a chelating agent in an amount of at least 1 mole per 1 mole of the alkoxide so as to eliminate about 65 to 95% by weight of the by-produced alcohol from the reaction mixture by distillation.

3. The coating composition according to claim 1, wherein the surfactant is a member selected from the group consisting of alkylbenzenesulfonic acid and salts thereof, naphthalenesulfonic acid and salts thereof, dialkylsulfosuccinic acid and salts thereof and alkyl sulfate derivatives.

4. The coating composition according to claim 1, wherein said transition element is titanium or zirconium.

5. The coating composition according to claim 1, wherein the oxide of the transition element formed upon baking is represented by $MeO_y$, Me being the transition element and y being the atomic valency of the transition element Me/2, and wherein the amounts of said chelate compound and fluoresin in said composition are defined by the following formulae:

$$\frac{MeO_y}{MeO_y + \text{Fireproof Material}} \times 100 = 10 \text{ to } 90 \text{ \% by weight}$$

and $$\frac{\text{Fluoresin}}{MeO_y + \text{Fireproof Material}} = 0.5 \text{ to } 5 \text{ by weight.}$$

6. The coating composition according to claim 5, wherein the amount of surfactant in said composition is defined by the following formula:

$$\frac{\text{Surfactant}}{MeO_y + \text{Fireproof Material}} \times 100 = 0.5 \text{ to } 30 \text{ \% by weight.}$$

7. The coating composition according to claim 2, wherein R is an alkyl group having 3 to 7 carbon atoms.

8. A method for forming an undercoating film on a substrate which assures the firm bonding of a top coating film comprising a fluororesin thereto, which comprises applying the coating composition according to claim 1 onto the substrate, and drying and heating said composition at a temperature higher than the melting point of the fluororesin contained therein.

* * * * *